(12) United States Patent
Fernandez et al.

(10) Patent No.: US 7,019,250 B2
(45) Date of Patent: Mar. 28, 2006

(54) QUICK CHANGE DEVICE FOR MOUNTING AN ACTUATOR TO A RESISTANCE WELDING GUN

(75) Inventors: Vernon Fernandez, Rochester Hills, MI (US); James W Strausbaugh, Clarkston, MI (US); Gerry Grzadzinski, Sterling Heights, MI (US); Feng Cao, Rochester Hills, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 98 days.

(21) Appl. No.: 10/740,203

(22) Filed: Dec. 18, 2003

(65) Prior Publication Data

US 2005/0092716 A1    May 5, 2005

Related U.S. Application Data

(60) Provisional application No. 60/516,930, filed on Nov. 3, 2003.

(51) Int. Cl.
*B23K 11/10* (2006.01)

(52) U.S. Cl. ...................... 219/86.25; 219/90

(58) Field of Classification Search ............. 219/86.21, 219/86.25, 86.32, 89, 90
See application file for complete search history.

(56) References Cited

U.S. PATENT DOCUMENTS

| 2,590,896 | A | * | 4/1952 | Seele .................... 301/9.1 |
| 2,776,362 | A | * | 1/1957 | Welch .................. 219/86.32 |
| 3,332,182 | A | * | 7/1967 | Mark .................... 52/127.12 |
| 5,525,774 | A | * | 6/1996 | Dolgas et al. ............. 219/89 |
| 6,751,852 | B1 | * | 6/2004 | Malsbury et al. ......... 29/722 |

* cited by examiner

*Primary Examiner*—Kevin P. Kerns
(74) *Attorney, Agent, or Firm*—Ralph E. Smith

(57) ABSTRACT

A quick change device has a mounting member for mounting an actuator to a resistance welding gun by headed fasteners. The mounting member has several keyhole type apertures arranged in a circle. The fasteners extend through the narrow portions of the keyhole type apertures and the fastener heads clamp the mounting member to the welding gun. To detach the actuator, the mounting member is first released by loosening the fasteners and rotating the mounting member until the heads of the fasteners align with the wide portions of the keyhole type apertures. An additional fastener extends through a round aperture which is removed before the mounting member is released and the actuator is detached.

8 Claims, 2 Drawing Sheets

QUICK CHANGE DEVICE FOR MOUNTING AN ACTUATOR TO A RESISTANCE WELDING GUN

RELATED APPLICATION(S)

This application claims the benefit of U.S. Provisional Patent Application Ser. No. 60/516,930, filed Nov. 3, 2003.

FIELD OF THE INVENTION

The present invention relates generally to quick change devices and more particularly to a quick change device for mounting an actuator to a resistance welding gun.

BACKGROUND OF THE INVENTION

One of the largest losses incurred by a production facility is the cost of downtime. Downtime is the time during which a production line is shut down due to failure of one of its parts. In the case of spot welding, a welding gun failure can result from a breakdown of the gun actuator. Failure of a welding gun can shut down an entire production line. The gun is unusable until the actuator can be replaced. Typically it takes about ten minutes to remove a failed actuator and replace it with a working one.

SUMMARY OF THE INVENTION

The purpose of this invention is to reduce the time required to remove and replace a welding gun actuator. This is accomplished by a quick change device which includes a mounting plate. The mounting plate has at least one and preferably two or more keyhole type apertures for fasteners which attach the mounting plate to the welding gun. The mounting plate can be released from the welding gun by loosening the fasteners and shifting the mounting plate to align the heads of the fasteners with the wide portions of the keyhole type apertures. The wide portions of the apertures are large enough to clear the fastener heads so that the mounting plate can be separated from the welding gun without the necessity of removing the fasteners.

Preferably, one of the apertures is of the non-keyhole type in which case the fastener in that aperture must be removed. However, the removal of a single fastener takes considerably less time than removing all of the fasteners as required heretofore.

Further in accordance with the invention, all of the keyhole type apertures are arranged in a circle about a center point of the mounting plate, with the relatively narrow portions of the apertures extending from the relatively wide portions in the same circumferential direction about the center point. Accordingly, it is only necessary to rotate the mounting plate in one direction to align the fastener heads with the relatively wide portions of the apertures before separating the mounting plate from the welding gun.

One object of the present invention is to provide a quick change device having the foregoing features and capabilities.

Further areas of applicability of the present invention will become apparent from the detailed description provided hereinafter. It should be understood that the detailed description and specific examples, while indicating the preferred embodiments of the invention, are intended for purposes of illustration only and are not intended to limit the scope of the invention.

BRIEF DESCRIPTION OF THE DRAWINGS

The present invention will become more fully understood from the detailed description and accompanying drawings, wherein.

DETAILED DESCRIPTION OF THE PREFERRED EMBODIMENTS

Figure 1:
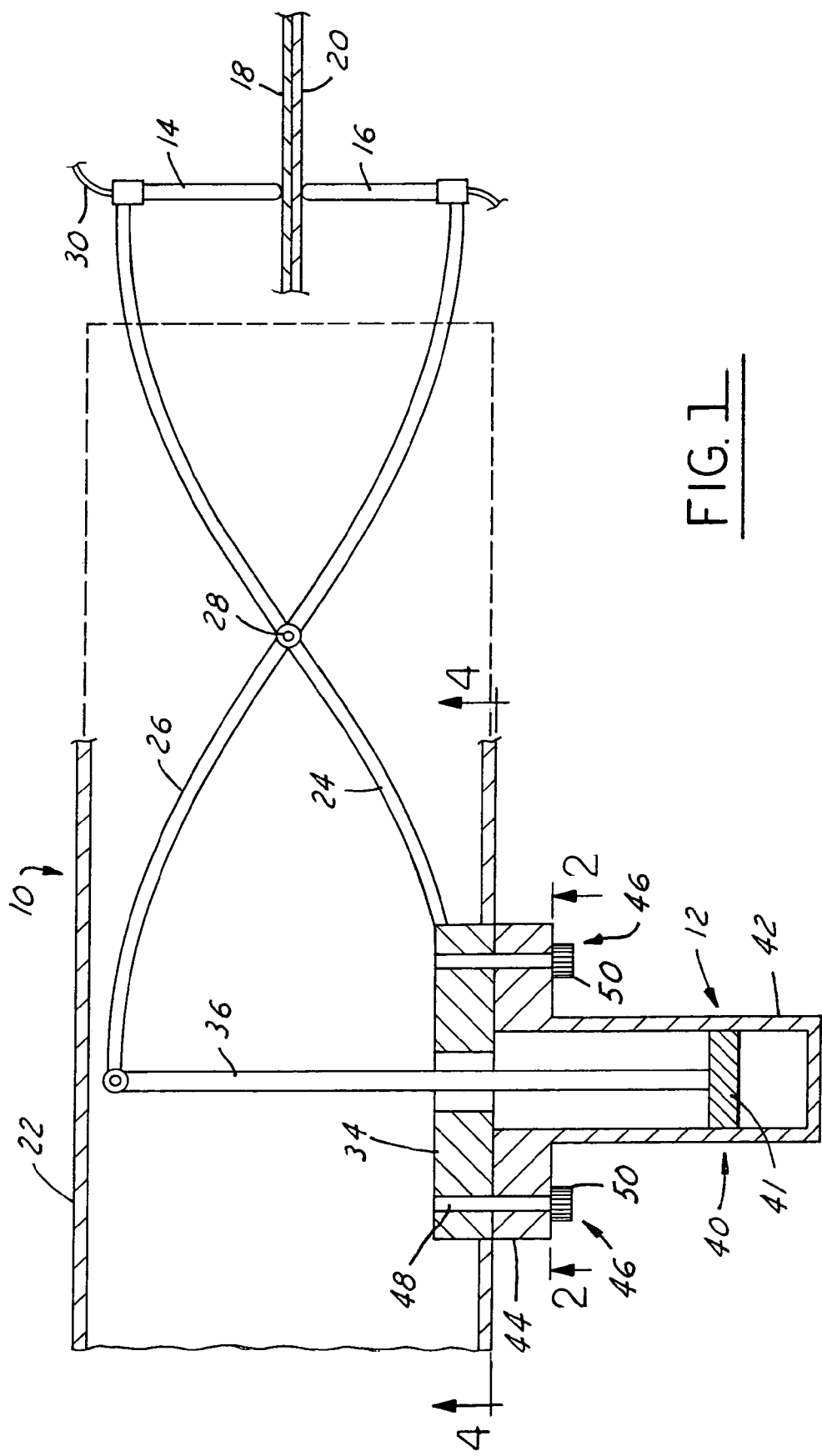
FIG. 1 is a semi-diagrammatic view partly in elevation and partly in section showing a welding gun, a welding gun actuator, and a quick change device for the actuator, in accordance with the invention.
Figure 2:
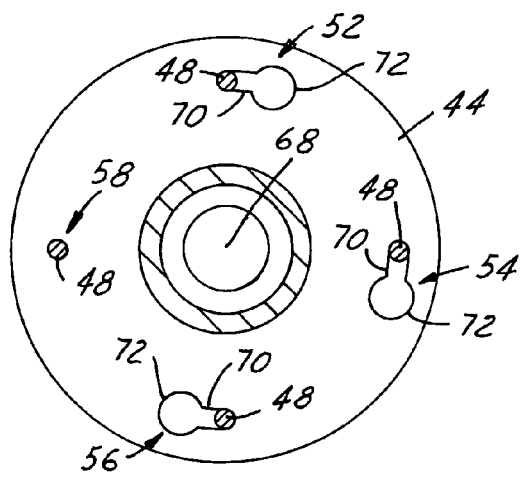
FIG. 2 is a diagrammatic view of the quick change device, taken on the line 2—2 in FIG. 1, showing the mounting plate in the clamped position.

The following description of the preferred embodiments is merely exemplary in nature and is in no way intended to limit the invention, its application, or uses.

Referring now more particularly to the drawings and especially FIGS. 1–4, there is shown a resistance welding gun 10 having an actuator 12 for relatively moving electrodes 14 and 16 toward and away from each other to spot weld two panels 18 and 20 together.

The welding gun 10 has a housing 22 for a pair of scissors-like, electrode holding arms 24 and 26. The arms are electrically insulated from one another and pivoted together at an intermediate point in their length by a pivot pin 28 fixed within the housing 22.

The electrode 14 is secured to an outer end of the arm 24. The electrode 16 is aligned with the electrode 14 and is secured to an outer end of the arm 26. The adjacent ends of the electrodes 14 and 16 are adapted to spot weld the two panels 18 and 20 together when current from an electric circuit 30 is applied to the electrodes.

The inner end of the arm 24 is secured to a plate 34 attached to the housing 22. The inner end of the arm 26 is secured to an outer end of a piston rod 36. The piston rod 36 is part of the actuator 12 which in this instance is in the form of a fluid-operated piston and cylinder assembly 40 having a piston 41 reciprocable in a cylinder 42, with the piston rod 36 being attached to the piston and extending through an end of the cylinder.

The cylinder 42 is secured to the housing 22 by a mounting member in the form of a plate 44 which in this instance is a flange integral with the cylinder. The mounting plate 44 abuts the housing plate 34 and is releasably secured thereto by similar fasteners 46 which preferably have threaded shanks 48 and enlarged heads 50 of larger diameter than the shanks.

The shanks 48 of the fasteners extend through the respective apertures 52, 54, 56 and 58 in the mounting plate 44 and thread into internally threaded holes 60, 62, 64 and 66 in the housing plate 34. Only four apertures are shown but more could be provided if desired.

The apertures 52, 54, 56 and 58 are arranged in circumferentially spaced apart relation in a circle centered on a center point 68. The threaded holes 60, 62, 64 and 66 in the housing plate 34 are arranged in the same circumferentially spaced apart relationship as the apertures.

Figure 3:
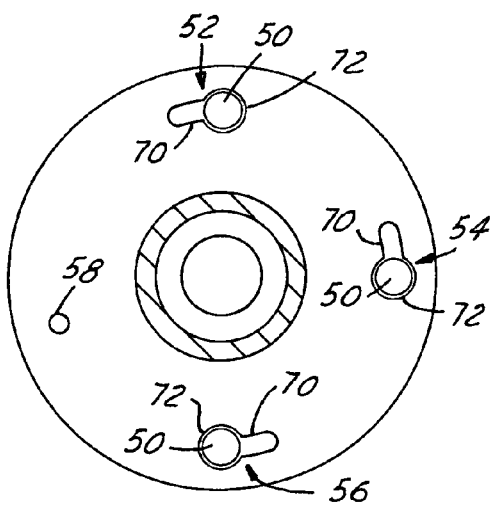
FIG. 3 is a view similar to FIG. 2, but showing the mounting plate rotated to a release position and showing the fastener heads rather than the shanks.
Figure 4:
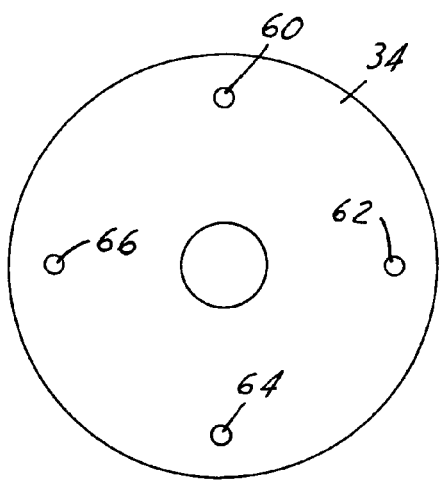
FIG. 4 is a view taken on the line 4—4 in FIG. 1.

The apertures 52, 54 and 56 are of the keyhole type, each having a relatively narrow shank-receiving portion 70 of a width greater than the diameter of the shanks 48 of the fasteners but less than the diameter of the heads 50 of the fasteners, and having at one end a relatively wide portion 72 of a size larger than the heads 50 of the fasteners so that the heads can pass through the relatively wide portions (see FIG. 3).

The keyhole-type apertures 52, 54 and 56 all have their shank-receiving portions 70 extending from the relatively wide portions 72 circumferentially relative to the center point 68 in the same direction.

The aperture 58 is a non-keyhole type aperture, that is, it is a simple round aperture just large enough to receive the shank 48 of a fastener but smaller than the fastener head.

In use, the mounting plate 44, and of course the entire cylinder 42 of which the mounting plate is a part, is rotated so that the narrow portions 70 of the apertures 52, 54 and 56 are aligned with the three threaded holes 60, 62 and 64 in the housing plate 34, and the non-keyhole type aperture 58 is aligned with the hole 66 in the housing plate. Three of the fasteners 46 are then inserted through the relatively narrow portions 70 of the apertures 52, 54 and 56 in the mounting plate 44 and threaded into the aligned holes 60, 62 and 64 in the housing plate 34 and a fourth fastener 46 is inserted through the non-keyhole type aperture 58 and threaded into the aligned hole 66. When the fasteners 46 are tightened, the fastener heads 50 clamp the mounting plate 44, and the actuator 12, securely to the housing plate 34.

In the event that the actuator 12 must be removed for repair or replacement, only the fastener in the non-keyhole type aperture 58 is removed. The remaining three fasteners in the keyhole type apertures 52, 54 and 56 are merely loosened so that the mounting plate 44 and actuator 12 can be rotated relative to the housing plate 34 far enough to place those three remaining fasteners in line with the relatively wide portions 72 of the keyhole type apertures. The actuator 12 can then be separated from the welding gun, with the heads 50 of the fasteners passing through the wide portions 72 of the keyhole type apertures.

Figure 5:
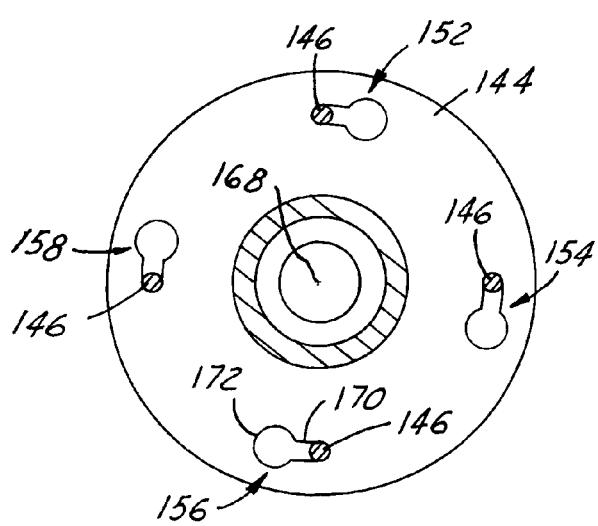
FIG. 5 is a view similar to FIG. 2, but shows a modification.

Reference is now made to FIG. 5 which shows a modification of the invention. In FIG. 5, all of the apertures in the mounting plate 144 are of the keyhole type. The apertures 152, 154 and 156 are exactly the same as the apertures 52, 54 and 56 in the embodiment of FIGS. 1–4. However, the aperture 158 differs from the aperture 58 in that the aperture 158 is also of the keyhole type and exactly like the keyhole type actuators 152, 154 and 156. All of the apertures 152, 154, 156 and 158 are arranged in circumferentially spaced apart relation in a circle about a center point 168 and all have their shank-receiving portions 170 extending from the relatively wide portions 172 circumferentially relative to the center point 168 in the same direction.

In use, the fasteners 146, which are exactly like the fasteners in the embodiment of FIGS. 1–4, are inserted through the relatively narrow portions 170 of the apertures 152, 154, 156 and 158 and, when tightened, clamp the mounting plate 144 to the housing plate by threading into the holes in the housing plate. To remove the mounting plate 144 and associated actuator, all of the fasteners are merely loosened so that the mounting plate 144 can be rotated to align the relatively wide portions 172 of all of the apertures with the fastener heads, and the mounting plate can be separated from the housing plate. None of the fasteners need to be removed.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A quick change device for mounting an actuator to a resistance welding gun, comprising:
   a mounting member for the actuator,
   a plurality of spaced-apart apertures in said mounting member,
   a plurality of fasteners,
   each of said fasteners having a shank of a first diameter and a head on one end of the shank of a second diameter larger than the first diameter,
   the shanks of the fasteners extending through the respective apertures and removably secured to the welding gun and the heads of the fasteners clamping the mounting member to the welding gun,
   at least one of the apertures being of the keyhole type having a relatively narrow shank-receiving portion of a width greater than the first diameter but less than the second diameter, and having a relatively wide portion of a size large enough to pass the head of the fastener that extends through the said one of the apertures, whereby the actuator may be released from the welding gun without removing all of said plurality of fasteners from said welding gun by loosening at least one of said fasteners that extends through the said one of the apertures and shifting the mounting member relative to the welding gun to align the heads of the plurality of fasteners that extends through the said one of the apertures with the relatively wide portion of the said one of the apertures after removing the remaining fastener or fasteners.

2. The quick change device of claim 1 wherein two or more of the apertures are of the keyhole type.

3. The quick change device of claim 2, wherein all of the apertures of the keyhole type have their shank-receiving portions extending from their relatively wide portions in the same direction.

4. The quick change device of claim 2, wherein all of the apertures of the keyhole type are arranged in a circle about a center point, and all of the apertures of the keyhole type have their shank-receiving portions extending from the relatively wide portions in the same circumferential direction about said center point.

5. The quick change device of claim 4, wherein said plurality of apertures includes a non-keyhole type aperture located on said circle.

6. A quick change device for mounting an actuator to a resistance welding gun, comprising:
   a mounting member for the actuator,
   a plurality of spaced apart apertures in said mounting member,
   a plurality of threaded fasteners,
   each of said fasteners having a shank of a first diameter and a head on one end of the shank of a second diameter larger than the first diameter,
   the shanks of the fasteners extending through the respective apertures and removably secured to the welding gun and the heads of the fasteners clamping the mounting member to the welding gun,
   all of the apertures being of the keyhole type having a relatively narrow shank-receiving portion of a width greater than the first diameter but less than the second diameter and a relatively wide portion of a size large enough to pass the heads of the fasteners,
   whereby the actuator may be released from the welding gun without removing all of the plurality of fasteners from said welding gun by loosening at least one of said plurality of fasteners and shifting the mounting member relative to the welding gun to align the heads of the plurality of fasteners with the relatively wide portions of the apertures.

7. The quick change device of claim 6, wherein the shank-receiving portions of all of said apertures extend from the relatively wide portions in the same direction.

8. The quick change device of claim 6, wherein all of the apertures are arranged in a circle about a center point and have their shank-receiving portions extending from the relatively wide portions in the same circumferential direction about said center point.

* * * * *